United States Patent
Brija et al.

(10) Patent No.: US 9,416,995 B2
(45) Date of Patent: Aug. 16, 2016

(54) HEATING AND COOLING UNIT WITH SEMICONDUCTOR DEVICE AND HEAT PIPE

(71) Applicant: Spring (U.S.A.) Corporation, Naperville, IL (US)

(72) Inventors: Francis Thomas Brija, Palm Beach Gardens, FL (US); Ping Wu, Ningbo (CN)

(73) Assignee: Spring (U.S.A.) Corporation, Naperville, IL (US)

( * ) Notice: Subject to any disclaimer, the term of this patent is extended or adjusted under 35 U.S.C. 154(b) by 50 days.

(21) Appl. No.: 14/471,949

(22) Filed: Aug. 28, 2014

(65) Prior Publication Data

US 2014/0366559 A1  Dec. 18, 2014

Related U.S. Application Data

(63) Continuation of application No. 13/495,643, filed on Jun. 13, 2012, now Pat. No. 8,850,829, which is a continuation-in-part of application No. 13/347,229, filed on Jan. 10, 2012, now abandoned.

(51) Int. Cl.
*F25B 21/04* (2006.01)
*A47J 36/26* (2006.01)
*A47F 10/06* (2006.01)

(52) U.S. Cl.
CPC .............. *F25B 21/04* (2013.01); *A47J 36/26* (2013.01); *A47F 10/06* (2013.01); *F25B 2321/0252* (2013.01); *F25D 2400/08* (2013.01)

(58) Field of Classification Search
CPC ............. F25B 21/04; F25B 2321/0252; F25D 2400/08; A47J 36/26; A47F 10/06
USPC .................. 62/3.3, 3.7, 259.2; 165/185, 80.4
See application file for complete search history.

(56) References Cited

U.S. PATENT DOCUMENTS

| | | | |
|---|---|---|---|
| 2,084,883 A | 6/1937 | Atchinson | |
| 2,677,365 A | 5/1954 | Beland | |
| 2,759,339 A | 8/1956 | Kundert | |
| 2,996,889 A | 8/1961 | Roeder | |
| 2,997,040 A * | 8/1961 | Bold | A47J 36/26 126/214 R |
| 3,516,485 A | 6/1970 | Mackay | |
| 3,603,767 A | 9/1971 | Scicchitano | |
| 3,823,307 A | 7/1974 | Weiss | |
| 3,965,969 A | 6/1976 | Williamson | |
| 3,999,601 A | 12/1976 | Spanoudis | |
| 4,123,919 A | 11/1978 | Fehlhaber | |
| 4,306,616 A | 12/1981 | Woods, Jr. et al. | |

(Continued)

FOREIGN PATENT DOCUMENTS

WO    2011008280 A1    1/2011

*Primary Examiner* — Mohammad M Ali
(74) *Attorney, Agent, or Firm* — Banner & Witcoff, Ltd.

(57) ABSTRACT

Aspects of the invention support simultaneous operation of a cooling side and a heating side of an apparatus to change the temperatures of a cooling serving surface and a heating serving surface, respectively. A cooling semiconductor device (which may comprise one or more Peltier devices) transfers heat from its top to its bottom while a heating semiconductor device (which may similarly comprise one or more Peltier devices) transfers heat from its bottom to its top. A heat pipe transfers waste heat from the cooling semiconductor device's bottom to the heating semiconductor device's bottom and waste cold from the heating semiconductor device's bottom to the cooling semiconductor device's bottom.

19 Claims, 16 Drawing Sheets

(56) References Cited

U.S. PATENT DOCUMENTS

| | | | |
|---|---|---|---|
| 4,593,752 A | 6/1986 | Tipton | |
| 4,823,554 A * | 4/1989 | Trachtenberg | A47J 36/26 62/239 |
| 4,856,579 A | 8/1989 | Wolfe | |
| 5,263,538 A | 11/1993 | Amidieu et al. | |
| 5,653,111 A | 8/1997 | Attey et al. | |
| 5,718,124 A | 2/1998 | Senecal | |
| 5,771,788 A | 6/1998 | Lee et al. | |
| 5,782,094 A | 7/1998 | Freeman | |
| 5,878,579 A | 3/1999 | Boyer, III | |
| 5,941,077 A * | 8/1999 | Safyan | A47J 36/26 62/3.3 |
| 5,966,940 A * | 10/1999 | Gower | F25B 21/04 165/61 |
| 6,020,638 A * | 2/2000 | Kobayashi | H05K 3/284 257/737 |
| 6,026,647 A * | 2/2000 | Coffee | A45C 11/20 62/3.62 |
| 6,085,535 A | 7/2000 | Richmond et al. | |
| 6,220,338 B1 | 4/2001 | Grandi | |
| 6,234,107 B1 * | 5/2001 | Tanaka | C23C 14/566 118/719 |
| 6,279,470 B2 | 8/2001 | Simeray et al. | |
| 6,295,820 B1 | 10/2001 | Cauchy et al. | |
| 6,301,901 B1 * | 10/2001 | Coffee | A45C 11/20 165/123 |
| 6,344,630 B1 * | 2/2002 | Jarvis | A47J 39/006 219/386 |
| 6,619,045 B1 | 9/2003 | Clark | |
| 6,691,894 B2 | 2/2004 | Chrisman et al. | |
| 6,735,958 B2 | 5/2004 | Baumann | |
| 6,976,371 B2 | 12/2005 | Gleason et al. | |
| 7,216,500 B2 | 5/2007 | Schwichtenberg et al. | |
| 7,242,000 B2 | 7/2007 | Archibald et al. | |
| 7,309,830 B2 | 12/2007 | Zhang et al. | |
| 7,426,835 B2 | 9/2008 | Bell et al. | |
| 7,451,603 B2 | 11/2008 | Tuszkiewicz et al. | |
| 7,665,311 B2 | 2/2010 | Steffensen et al. | |
| 8,277,763 B2 * | 10/2012 | Steinmann | B01L 3/50851 136/242 |
| 8,839,633 B2 * | 9/2014 | Quisenberry | B60H 1/00478 62/3.2 |
| 2001/0013224 A1 * | 8/2001 | Ohkubo | F25B 21/04 62/3.7 |
| 2001/0052409 A1 * | 12/2001 | Miki | F28F 21/02 165/80.4 |
| 2002/0184895 A1 * | 12/2002 | Anderson | F25B 21/04 62/3.6 |
| 2003/0029174 A1 | 2/2003 | Lee | |
| 2003/0141045 A1 | 7/2003 | Oh et al. | |
| 2003/0192321 A1 * | 10/2003 | Baumann | A47J 36/26 62/3.3 |
| 2004/0025516 A1 * | 2/2004 | Van Winkle | B60H 1/00478 62/3.3 |
| 2004/0134200 A1 | 7/2004 | Schroeder et al. | |
| 2004/0171269 A1 * | 9/2004 | Kondo | B24B 37/005 438/694 |
| 2004/0231997 A1 * | 11/2004 | Wang | C23C 18/1628 205/143 |
| 2005/0045702 A1 | 3/2005 | Freeman et al. | |
| 2005/0103212 A1 * | 5/2005 | Cronin | A47J 36/2483 99/467 |
| 2005/0257532 A1 * | 11/2005 | Ikeda | F25B 21/02 62/3.7 |
| 2005/0274118 A1 * | 12/2005 | McMurry | F25B 21/02 62/3.6 |
| 2006/0005548 A1 | 1/2006 | Ruckstuhl | |
| 2006/0191271 A1 * | 8/2006 | Takahashi | F25B 21/04 62/3.7 |
| 2006/0232891 A1 | 10/2006 | Bushnik et al. | |
| 2006/0237182 A1 | 10/2006 | Godecker et al. | |
| 2006/0277924 A1 * | 12/2006 | Platkin | A47J 36/2483 62/3.3 |
| 2007/0120137 A1 * | 5/2007 | Wilson | B60Q 1/0041 257/98 |
| 2007/0227456 A1 | 10/2007 | Borey | |
| 2008/0016881 A1 * | 1/2008 | Steffensen | F25B 21/04 62/3.3 |
| 2008/0099186 A1 | 5/2008 | Yu et al. | |
| 2008/0168795 A1 | 7/2008 | Alfille | |
| 2008/0173566 A1 | 7/2008 | Lowenstein | |
| 2008/0190119 A1 * | 8/2008 | Smayling | G06F 1/20 62/56 |
| 2009/0000310 A1 | 1/2009 | Bell et al. | |
| 2009/0020269 A1 | 1/2009 | Chang et al. | |
| 2009/0084526 A1 | 4/2009 | Chang et al. | |
| 2009/0277187 A1 * | 11/2009 | McGann | F25B 21/02 62/3.6 |
| 2010/0043451 A1 * | 2/2010 | Alahyari | A23L 3/16 62/3.3 |
| 2010/0050659 A1 | 3/2010 | Quisenberry et al. | |
| 2010/0059880 A1 | 3/2010 | Baek | |
| 2010/0127089 A1 | 5/2010 | Sakami | |
| 2010/0133355 A1 | 6/2010 | Park et al. | |
| 2010/0186931 A1 | 7/2010 | Obara et al. | |
| 2010/0198204 A1 | 8/2010 | Rogers | |
| 2010/0269517 A1 | 10/2010 | Ikeda et al. | |
| 2011/0072834 A1 | 3/2011 | Ishikura et al. | |
| 2011/0073469 A1 * | 3/2011 | Ma | C25D 17/00 204/270 |
| 2011/0194578 A1 | 8/2011 | Hirose et al. | |
| 2011/0197598 A1 | 8/2011 | Cheng et al. | |
| 2011/0203295 A1 | 8/2011 | Hsu et al. | |
| 2011/0316571 A1 * | 12/2011 | Kiyokawa | G01R 31/2891 324/750.16 |
| 2012/0290023 A1 | 11/2012 | Boyden et al. | |

* cited by examiner

FIG. 1 (COOLING OPERATION)

FIG. 2 (HEATING OPERATION)

FIG. 3 (PELTIER DEVICE)

FIG. 4 (HEAT PIPE)

HEATING AND COOLING UNIT WITH SEMICONDUCTOR DEVICE AND HEAT PIPE

This application is a continuation of U.S. patent application Ser. No. 13/495,643, entitled "Heating and Cooling Unit with Semiconductor Device and Heat Pipe" and filed on Jun. 13, 2012, the entire disclosure of which is hereby incorporated by reference, which is a continuation-in-part of U.S. patent application Ser. No. 13/347,229, entitled "Heating and Cooling Unit with Semiconductor Device and Heat Pipe" and filed on Jan. 10, 2012, the entire disclosure of which is hereby incorporated by reference.

TECHNICAL FIELD

Aspects of the disclosure relate to a hot/cold unit for heating and/or cooling an item on a serving surface. In particular, the hot/cold unit uses a semiconductor device, such as a Peltier device, and a heat pipe.

BACKGROUND

Perishable foods for home, market, catering and restaurant buffets are conventionally chilled by ice or commercially manufactured containers of freezable material, or by refrigeration systems. When the ice melts and the freezable material warms, these cooling media lose their ability to keep foods safe and may render them unsuitable or hazardous for consumption. Refrigeration systems are bulky and costly, requiring condensers, coils and harmful chemicals and, further, must be serviced and maintained. Additionally, they are not easily adapted for portability.

Other foods need to be heated or kept warm for home, market, catering and restaurant buffet service. Conventional sources of heat include flame and electricity, e.g. by use of alcohol-based combustible gels or by electric hot plates. Flame sources often produce local hot spots and uneven heating and may produce fumes, odors, or other combustion products. The indoor pollution and health risks to food service workers and patrons from these combustion products may be viewed with concern by those in the industry.

In the presentation of food and/or beverages such as for a buffet service, it is often desirable to store, transport, and/or present the buffet items in a convenient, presentable fashion. It is often further desirable to provide the items either above or below the ambient temperature of the presentation environment. Moreover, in-home hosting has trended upward, and could benefit from equipment improvement. Further, the costs and convenience of improved buffet service, storage, transportation, and/or presentation means may be improved such that they are more accessible and feasible in the market place.

While traditional servers for heating and/or cooling may not require fuel or ice to achieve a desired temperature of an item, traditional servers may rely on a temperature adjusting element in conjunction with an active exchange device, e.g., a liquid circulation pump, to facilitate energy transfer and thus mitigating the temperature of the temperature adjusting element. This approach may generate noise may typically increases the cost of the traditional server.

SUMMARY

An aspect of the invention provides apparatuses, computer-readable media, and methods for changing the temperature of a serving surface in order to cool or heat an item on the serving surface. Heat is transferred to or from the serving surface through a semiconductor device (e.g., a Peltier device), a heat pipe and a heat sink.

With another aspect of the invention, an apparatus for reducing the temperature of a serving surface includes at least one Peltier device that transfers heat from the serving surface to a heat pipe to a heat exchange device. Alternatively, the apparatus may increase the temperature of the serving surface by reversing the operation of the at least one Peltier device.

With another aspect of the invention, a control device activates the at least one Peltier device from a measured temperature of the serving surface and a temperature setting. The control device activates the at least one Peltier device in order change the serving surface according to the temperature setting. Moreover, hysteresis may be incorporated so that control cycling of the at least one Peltier device may be reduced.

With another aspect of the invention, a plurality of Peltier devices may be partitioned into different subsets so that the control device may activate different subsets during different time intervals. When the measured temperature of the serving surface is outside a temperature range, all of the Peltier devices may be activated, while only a selected subset may be activated when the measured temperature is within the temperature range and until a hysteresis temperature is reached.

With another aspect of the invention, an apparatus has a cooling side for changing the temperature of a cooling serving surface and a heating side for changing the temperature of a heating serving surface. A cooling semiconductor device transfers heat from its top to its bottom while a heating semiconductor device transfers heat from its bottom to its top, where each semiconductor device may comprise one or more Peltier devices. A heat pipe transfers waste heat from the cooling semiconductor device's bottom to the heating semiconductor device's bottom and waste cold from the heating semiconductor device's bottom to the cooling semiconductor device's bottom. The cooling side and the heating side of the apparatus are thermally isolated so that the cooling service surface and the heating serving surface can operate simultaneously without adversely affecting the temperature of the other serving surface.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
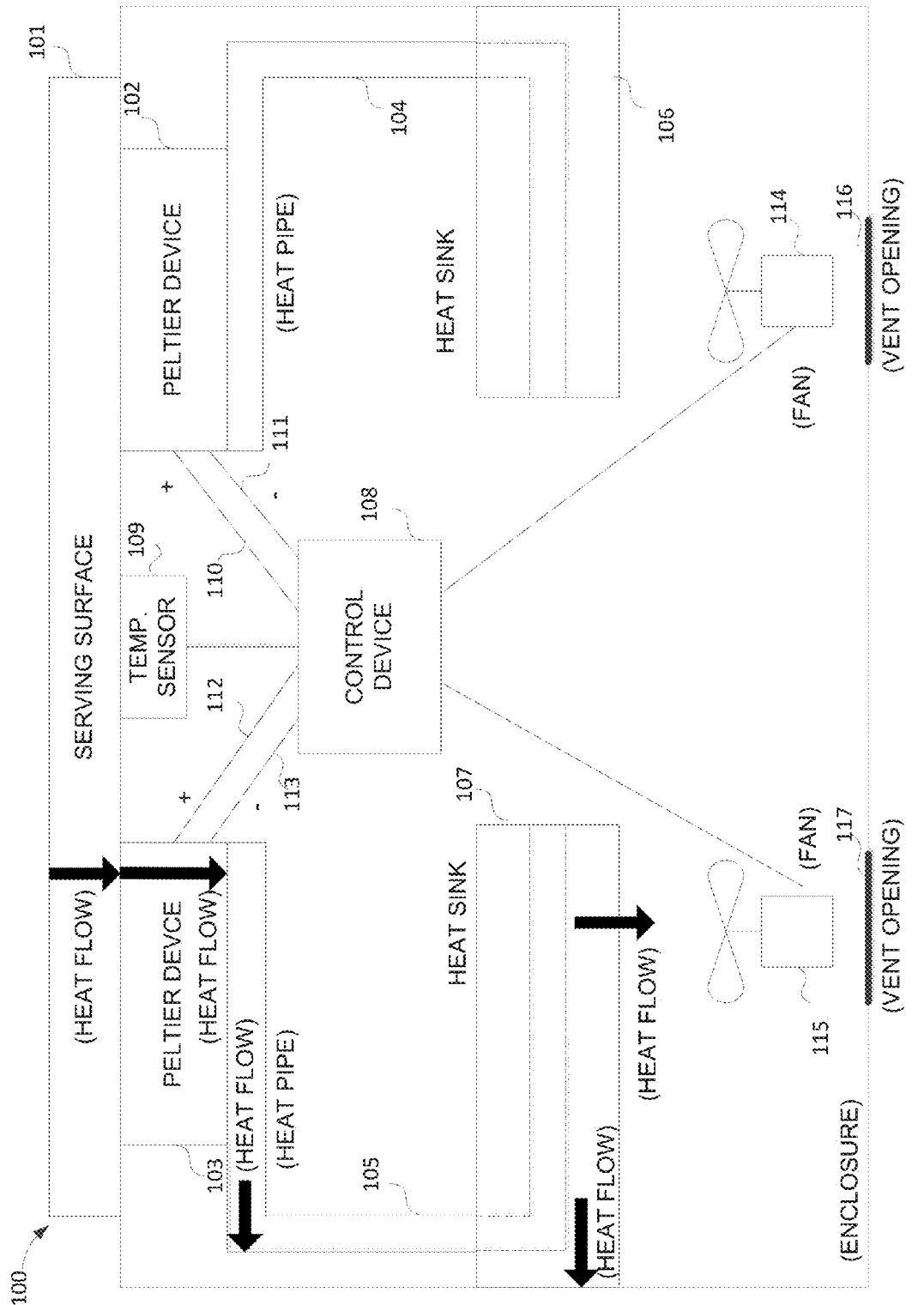
FIG. 1 shows a block diagram of a serving apparatus operating in a cooling mode in accordance with an embodiment of the invention.

FIG. 1 shows a block diagram 100 of a serving apparatus operating in a cooling mode in accordance with an embodiment of the invention. Block diagram 100 shows the basic elements of the serving apparatus but may not explicitly show the dimensions and relative placement of the elements. For example, heat pipes 105 and 104 may be bent in a horizontal plane rather than a vertical plane so that the operation of the heat pipes is not adversely affected (e.g., by gravity).

The measured temperature of serving surface 101 is changed by transferring heat from Peltier devices 102 and 103 through heat pipes 104 and 105 and through heat sinks 106 and 107, respectively.

Control device 108 activates and deactivates Peltier devices 102 and 103 based on an indication from temperature sensor 109 that is indicative of the measured temperature of serving surface 101. Temperature sensor 109 is typically placed against serving surface 101 in order to provide thermal coupling. For example, when the measured temperature is above a cooling temperature setting (i.e., the desired temperature) control device 108 provides electrical power to Peltier devices 102 and 103 through electrical connections 110 and 111 and connections 112 and 113, respectively.

With some embodiments, heat transfer may be enhanced by fans 114 and 115 producing air circulation from heat sinks 106 and 107, respectively, and through vent openings 116 and 117, respectively.

Figure 2:
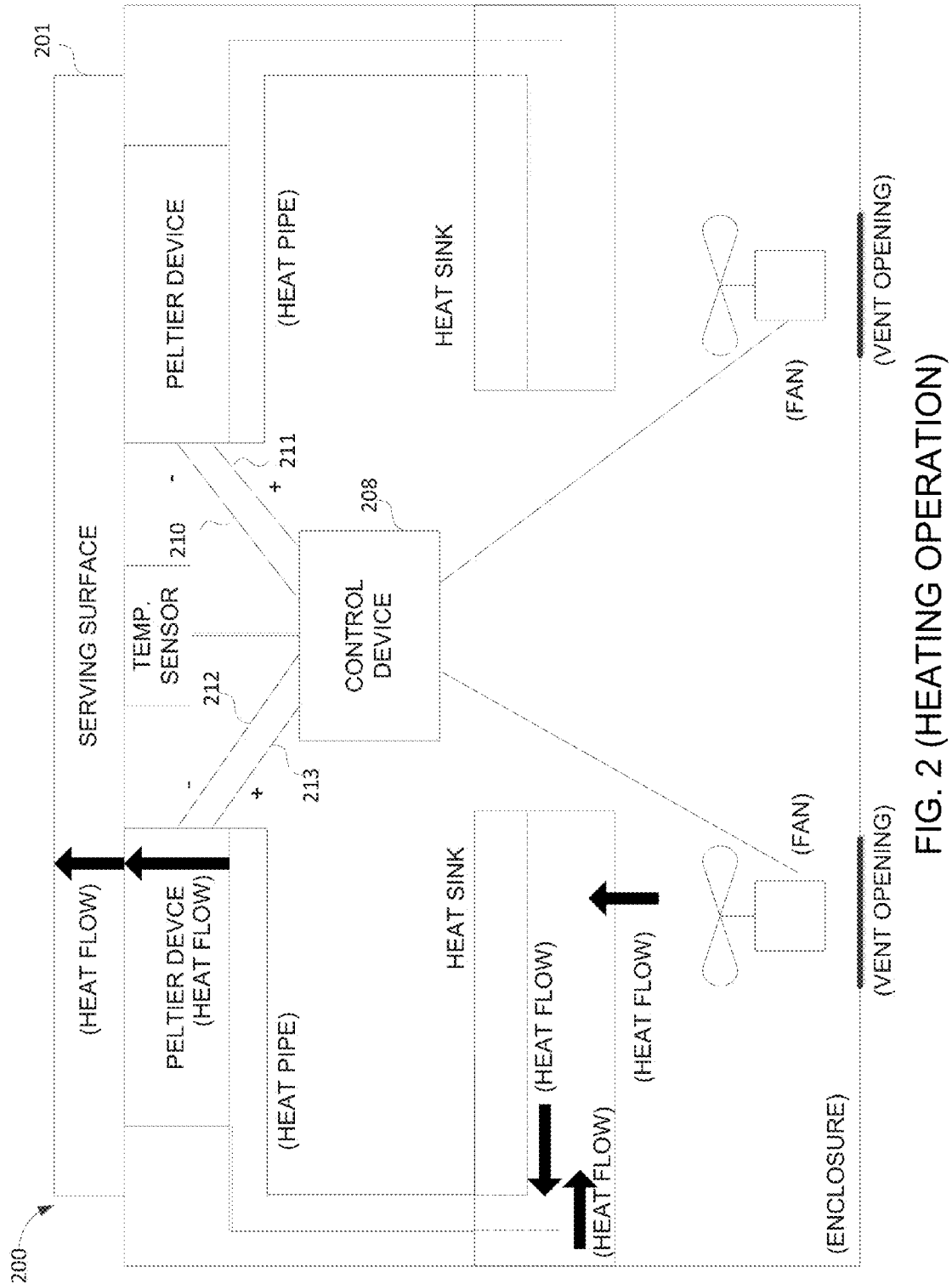
FIG. 2 shows a block diagram of a serving apparatus operating in a heating mode in accordance with an embodiment of the invention.

FIG. 2 shows a block diagram 200 of a serving apparatus operating in a heating mode in accordance with an embodiment of the invention. With some embodiments, the serving apparatus may be the same serving apparatus as with block diagram 100.

Control device 208 reverses the transfer of heat with respect to block diagram 100 by reversing the electrical polarity of electrical connections 210 and 211 and connections 212 and 213. (As will be discussed, the Peltier effect is a reversible process.) Consequently, heat flows to serving surface 201 to heat it.

Figure 3:
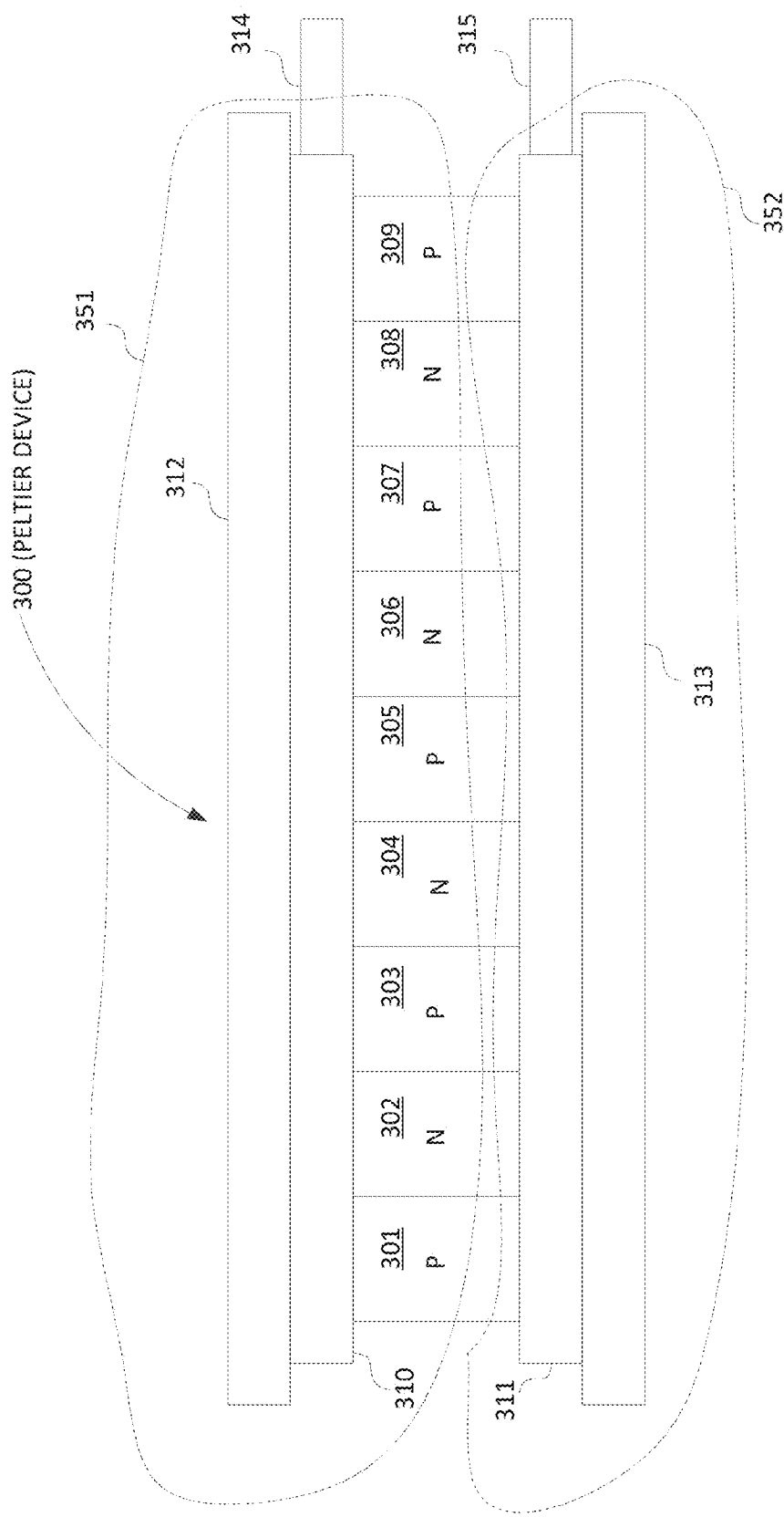
FIG. 3 shows a Peltier device in accordance with an embodiment of the invention.

FIG. 3 shows Peltier device 300 in accordance with an embodiment of the invention. However, some embodiments may use other types of semiconductor devices that provide similar heating and/or cooling characteristics. Heat is transferred between top side 351 and bottom side 352 based on the Peltier effect. Thermoelectric cooling by Peltier device 300 uses the Peltier effect to create a heat flux between the junctions of two different types of materials. Peltier device 300 may be classified as a heat pump. When direct current is provided to Peltier device 300, heat is moved from one side to the other. Peltier device 300 may be used either for heating or for cooling since the Peltier effect is reversible. For example, heat may be transferred from top side 351 to bottom side 352 to cool a serving surface by providing electrical power at terminals 314 and 315. Moreover, the direction of the heat transfer may be reversed (i.e., from bottom side 352 to top side 351) in order to heat the serving surface by reversing the polarity of the electrical power at terminals 314 and 315.

Peltier device 300 comprises a plurality of N type and P type semiconductor grains 301-309 that are electrically interconnected through electrical conductor arrangements 310 and 311. Ceramic layers 312 and 313 provide thermal conductivity as well as electrical isolation so that Peltier device 300 is able to cool or heat a serving surface. With some embodiments, the serving surface and heat pipe are thermally coupled to ceramic layers 312 and 313, respectively.

With some embodiments, one or more Peltier devices may be used to exchange heat with the serving surface. For example, with the embodiment shown in FIG. 5, four Peltier devices may provide faster cooling than with one Peltier device. Additional Peltier devices may be used; however, electrical power and physical constraints may be factors that limit the number of Peltier devices.

Figure 4:
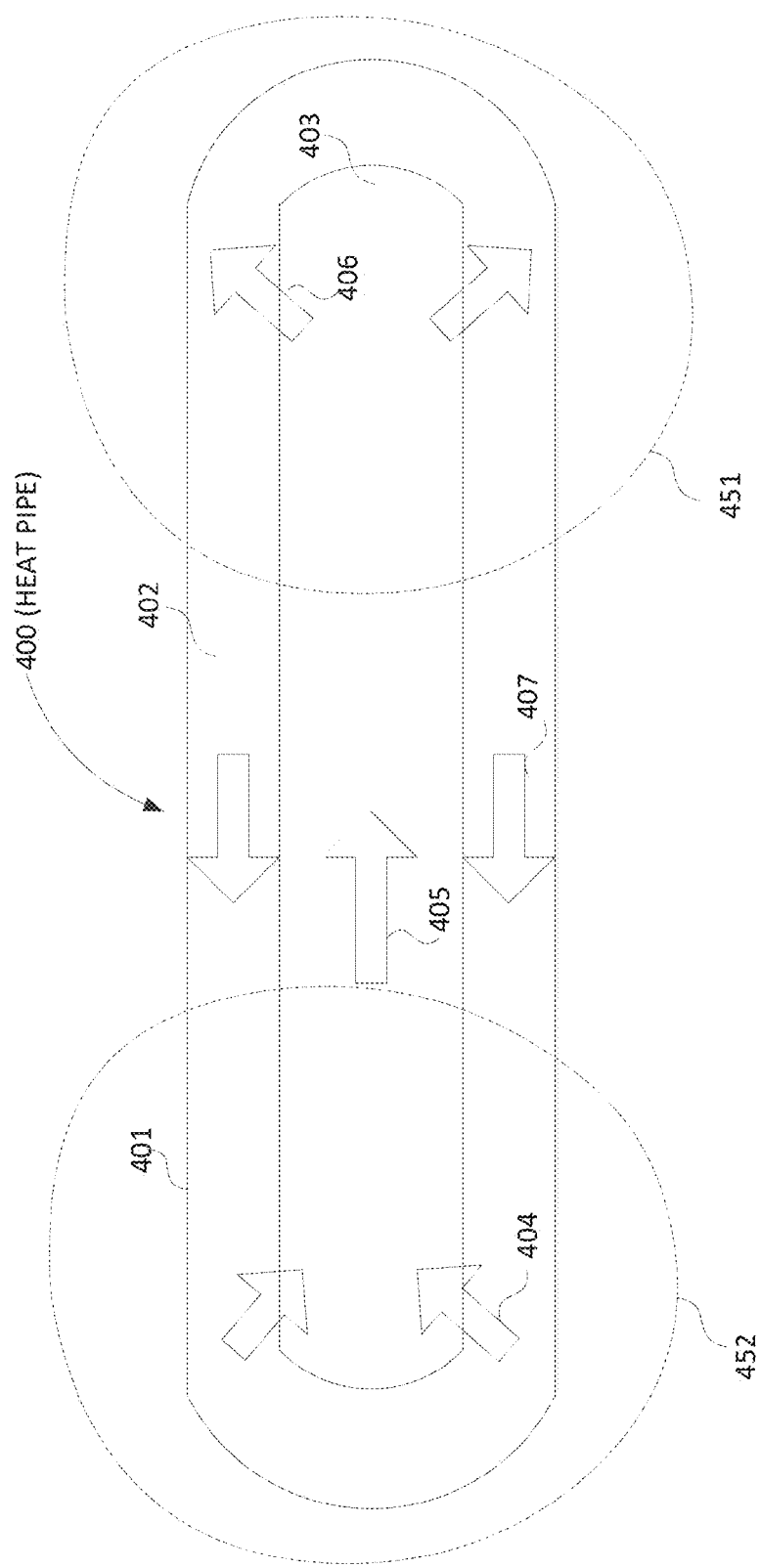
FIG. 4 shows a heat pipe in accordance with an embodiment of the invention.

FIG. 4 shows heat pipe 400 in accordance with an embodiment of the invention. With some embodiments, heat pipe 400 is a heat-transfer device that combines the principles of both thermal conductivity and phase transition to efficiently manage the transfer of heat between two solid interfaces. At the hot interface within heat pipe 400, which is typically at a very low pressure, a liquid (fluid) is in contact with a thermally conductive solid surface that turns into a vapor by absorbing heat from the surface. The vapor condenses back into a liquid at the cold interface, releasing the latent heat. The liquid then returns to the hot interface through either capillary action or gravity action, where it evaporates once more and repeats the cycle. In addition, the internal pressure of the heat pipe may be set or adjusted to facilitate the phase change depending on the demands of the working conditions of the thermally managed system. With some embodiments, heat pipe 400 does not contain mechanical moving parts and typically requires little or no maintenance.

Heat pipe 400 may be a heat-transfer device that combines the principles of both thermal conductivity and phase transition to efficiently manage the transfer of heat between two ends. With traditional systems, a radiator using single-phase convection with a high-speed motor often provides heat transfer. However, heat pipe 400 can transfer the heat efficiently without a high-speed motor.

Heat pipe 400 transports heat from portion 452 to portion 451. Heat pipe 400 comprises casing 401, wick 402, and vapor cavity 403. Casing 401 may comprise a sealed pipe or tube made of a material with high thermal conductivity such as copper or aluminum at both hot and cold ends. Working fluid evaporates to vapor absorbing thermal energy at event 404. Examples of such fluids include water, ethanol, acetone, sodium, or mercury. The vapor migrates along cavity 403 from portion 452 (high temperature end) to portion 451 (low temperature end). The vapor condenses back to fluid and is absorbed by wick 402 at event 406, and the fluid flows back to portion 402 through wick 402.

Figure 5:
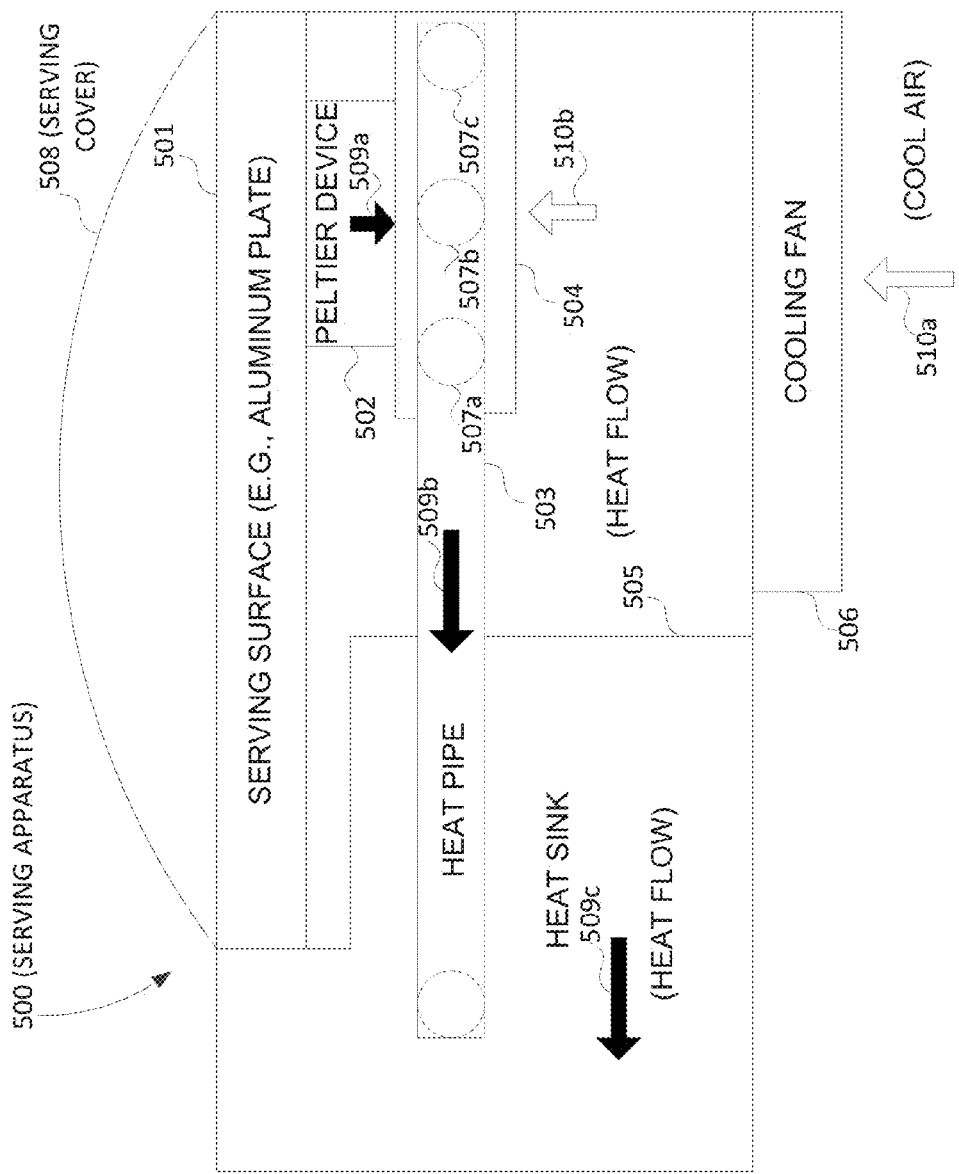
FIG. 5 shows a serving apparatus in accordance with an embodiment of the invention.

With some embodiments, referring to FIG. 5, heat pipe 503 comprises a sealed pipe or tube made of a material with high thermal conductivity, i.e., copper at both hot and cold ends. For example, a copper pipe or tube may be approximately 300 MM long with a diameter of approximately 8 mm. Heat pipe 503 is typically constructed with a tube shell, wick and end caps. Heat pipe 503 may be drawn into negative pressure and may be filled with the fluid such as pure water. Wick 402 is typically constructed with a capillary porous material. Evaporation of the fluid occurs at one end of heat pipe 503, while condensation occurs at the other end. When the evaporation end is heated, the capillary action in the fluid evaporates quickly. With a small gravity difference between two ends, the vapor flows to the other end, releasing heat. The vapor is then re-condensed into fluid, which runs along the porous material by capillary forces back into the evaporation end. This cycle is repeated to transfer the heat from the one end to the other end of heat pipe 503. This cycle is typically fast, and the heat conduction is continuous. Good performance of the wick is often characterized by:

1. Large capillary action or small effective aperture of wick,
2. Smaller fluid flow resistance, which have higher permeability,
3. Good thermal conductivity characteristics, and
4. Good repeatability and reliability in the manufacturing process.

Referring to FIG. 4, heat pipe 400 may have bends in order to route the heat transfer to or from a heat exchange device providing that the bends to not adversely affect the capillary or gravity action of heat pipe 400. For example, referring to FIG. 5, heat pipe 503 is bent in a horizontal plane to route the heat between Peltier device 502 and heat sink 505.

FIG. 5 shows serving apparatus 500 in accordance with an embodiment of the invention. While serving apparatus 500 is depicted in the cooling mode, apparatus 500 may be used to heat aluminum plate 501 (which functions as the serving surface on which an item is placed) based on the previous discussion.

Peltier device 502 is thermally coupled to serving surface 501 and copper block 504, where the top side (corresponding to ceramic layer 312 as shown in FIG. 3) is physically situated against serving surface 501 and the bottom side (corresponding to ceramic layer 313) is physically situated against copper block 504. Thermal conductivity may be enhanced by ensuring the flatness of the installation surface, and coating the contact surface with a thin layer of heat conduction silicon grease. Also, in order to avoid fracturing the ceramic layers of Peltier device 502, the pressure against the layers should be even and not excessive when fixing device 502.

Heat pipe 503 is thermally coupled to Peltier device 502 through copper block 504 so that heat flows along heat flow 509*a* and 509*b*. However, with some embodiments, heat pipe 503 may be directly placed against Peltier device 502. Heat pipe 502 transports heat along heat flow 509*b* by traversing through copper block 504 via branches 507*a*-507*c* and heat sink 505. Heat is thus transported along heat flow 509*c* and into the surrounding environment of serving apparatus 500.

With some embodiments, heat sink 505 may be constructed from copper and/or aluminum in order to achieve performance, size, and cost objectives.

With some embodiments, fan 506 operates when apparatus is operating in the cooling mode. However, with some embodiments, fan 506 may operate in the heating and/or cooling modes. Fan 506 assists in the transfer of heat by drawing in cool air 510*a* and 510*b* so that heat sink 505 may be kept to a smaller size than without fan 506. With some embodiments, the speed of fan 506 may be changed based on the temperature of serving surface 501. For example, the speed may be increased when the difference of measured temperature of serving surface 501 and the desired temperature increases. However, with some embodiments, the speed of fan 506 may be fixed when fan 506 is activated and may operate during the entire duration of operation.

With some embodiments, while not explicitly shown in FIG. 5, a cooling fan may circulate air to provide inner air convection within the serving chamber (within serving cover 508 and serving plate 501) to enhance the cooling of food within the chamber. With some embodiments, a fan may support inner air convection when the apparatus is operating in the heating mode.

Figure 6:
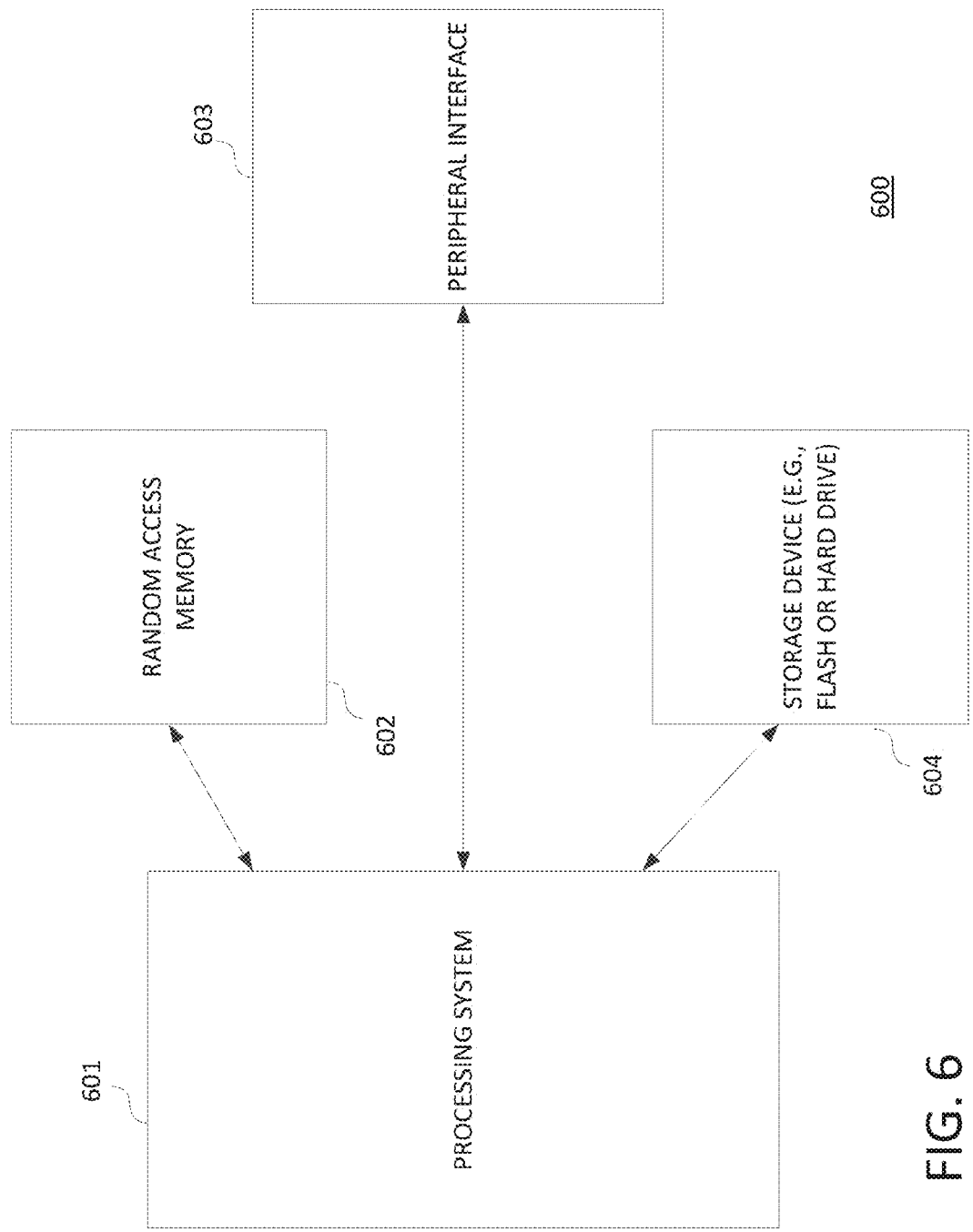
FIG. 6 shows a control device in accordance with an embodiment of the invention.

FIG. 6 shows control device 600 for controlling apparatus 100 (corresponding to control device 108 as shown in FIG. 1), apparatus 200 (corresponding to control device 208 as shown in FIG. 2), and apparatus 500 (as shown in FIG. 5) in accordance with an embodiment of the invention. Processing system 601 may execute computer executable instructions from a computer-readable medium (e.g., storage device 604) in order provide verify communication redundancy for a network, Memory 602 is typically used for temporary storage while storage device 504 may comprise a flash memory and/or hard drive for storing computer executable instructions and a profile image. However, computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing system 601. The executable instructions may carry out any or all of the method steps described herein.

With some embodiments, processing system 601 may correspond to one or more processors and storage device 604 may correspond to one or more memories.

Control device 600 may be implemented as one or more ASICs or other integrated circuits (e.g., a single chip computer) having instructions for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

Figure 8:
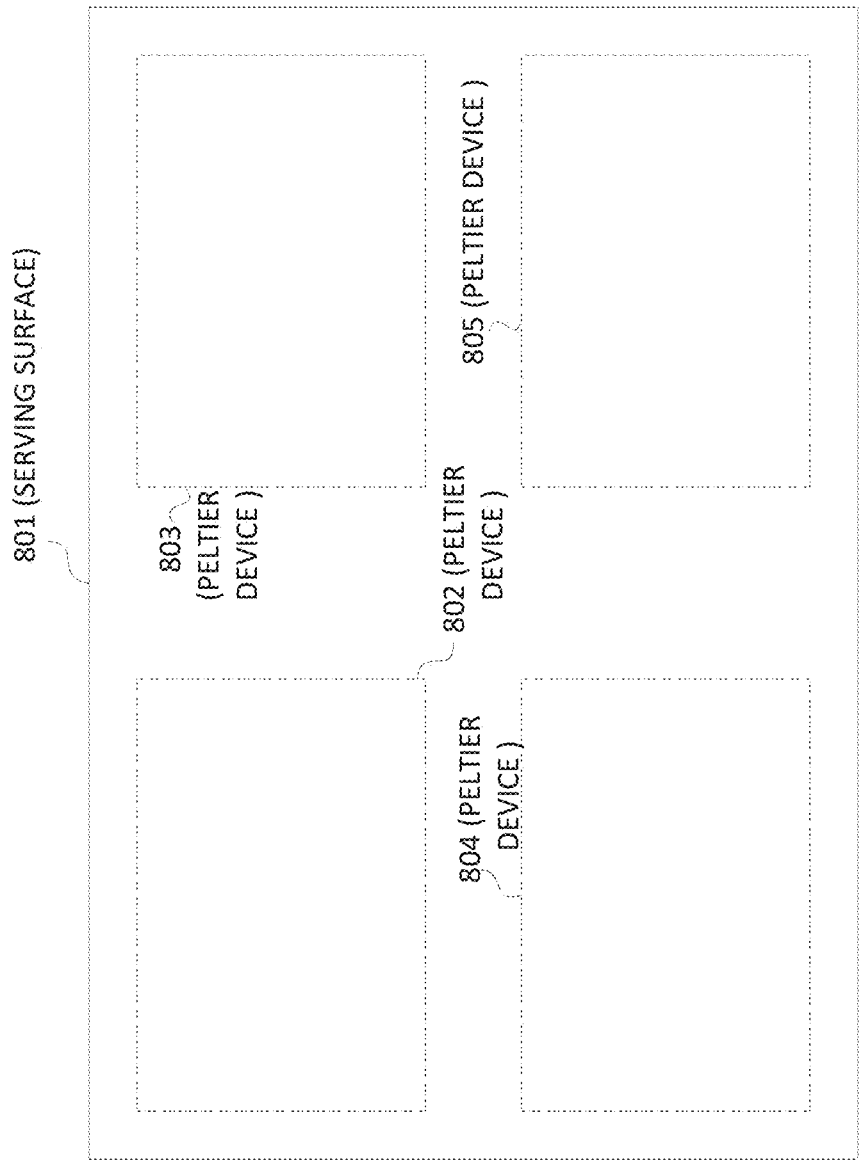
FIG. 8 shows an arrangement of Peltier devices for changing a serving surface temperature in accordance with an embodiment of the invention.

With some embodiments, control device 600 supports different control capabilities for heating and/or cooling. For example, device 600 may obtain a temperature setting (desired temperature) from a user through an input device and control one or more Peltier devices (e.g., Peltier devices 802-805 as shown in FIG. 8) to compensate for environmental factors in order to approximate the desired temperature. Control device 600 may also sense when cover 508 (as shown in FIG. 5) is open (e.g. through a switch not explicitly shown), and control the Peltier devices accordingly. For example, control device 600 may activate the Peltier devices for a longer period of time when cover 508 is open than when it is shut.

Figure 7:
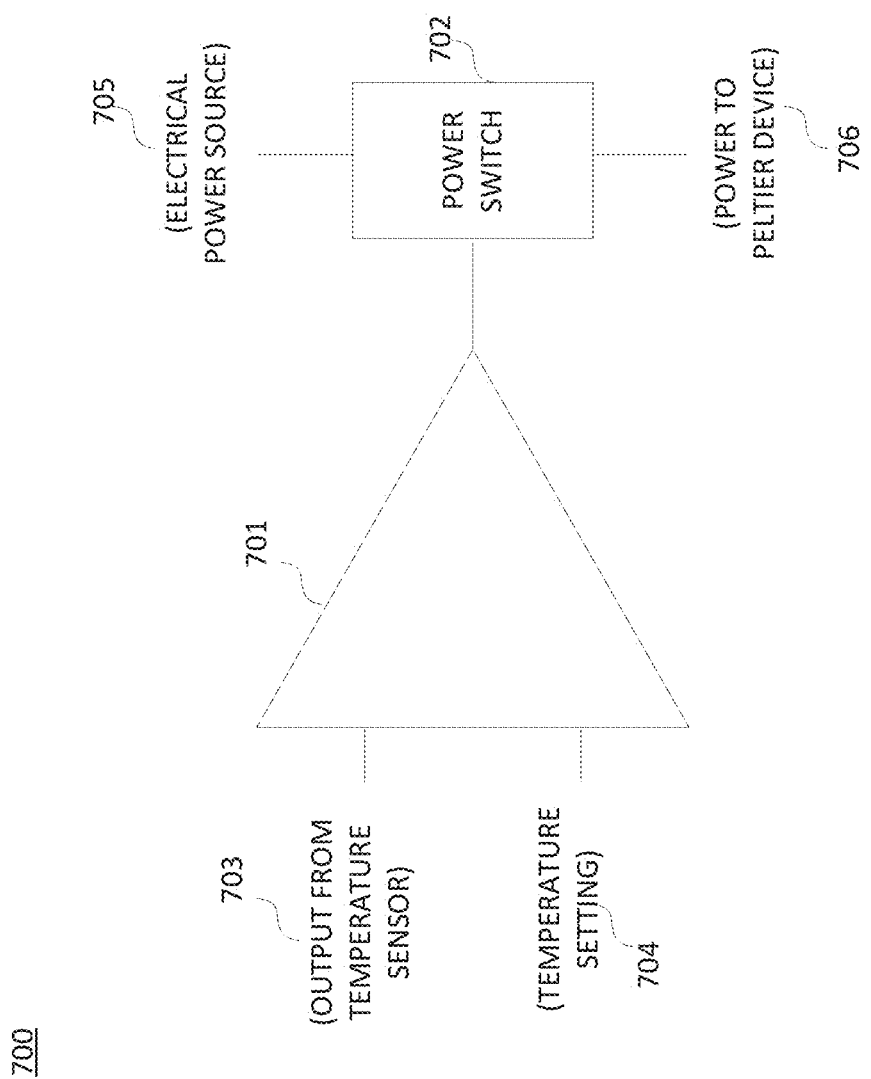
FIG. 7 shows circuitry for controlling Peltier devices in accordance with an embodiment of the invention.

FIG. 7 shows circuitry 700 for controlling Peltier devices in accordance with an embodiment of the invention. While some of the functionality of a serving apparatus may be implemented with a control device (e.g., control device 600 as shown in FIG. 6), some or all of the functionalities may be implemented with separate circuitry, e.g., circuitry 700. For example, circuitry 700 controls the activation of the Peltier devices by a comparator 701 comparing temperature setting 704 and measured temperature 703. Comparator 701 may have hysteresis characteristics so that once Peltier device 706 is activated by providing electrical power from source 705 through power switch 702, activation continues until the serving surface reaches a hysteresis temperature.

Figure 11:
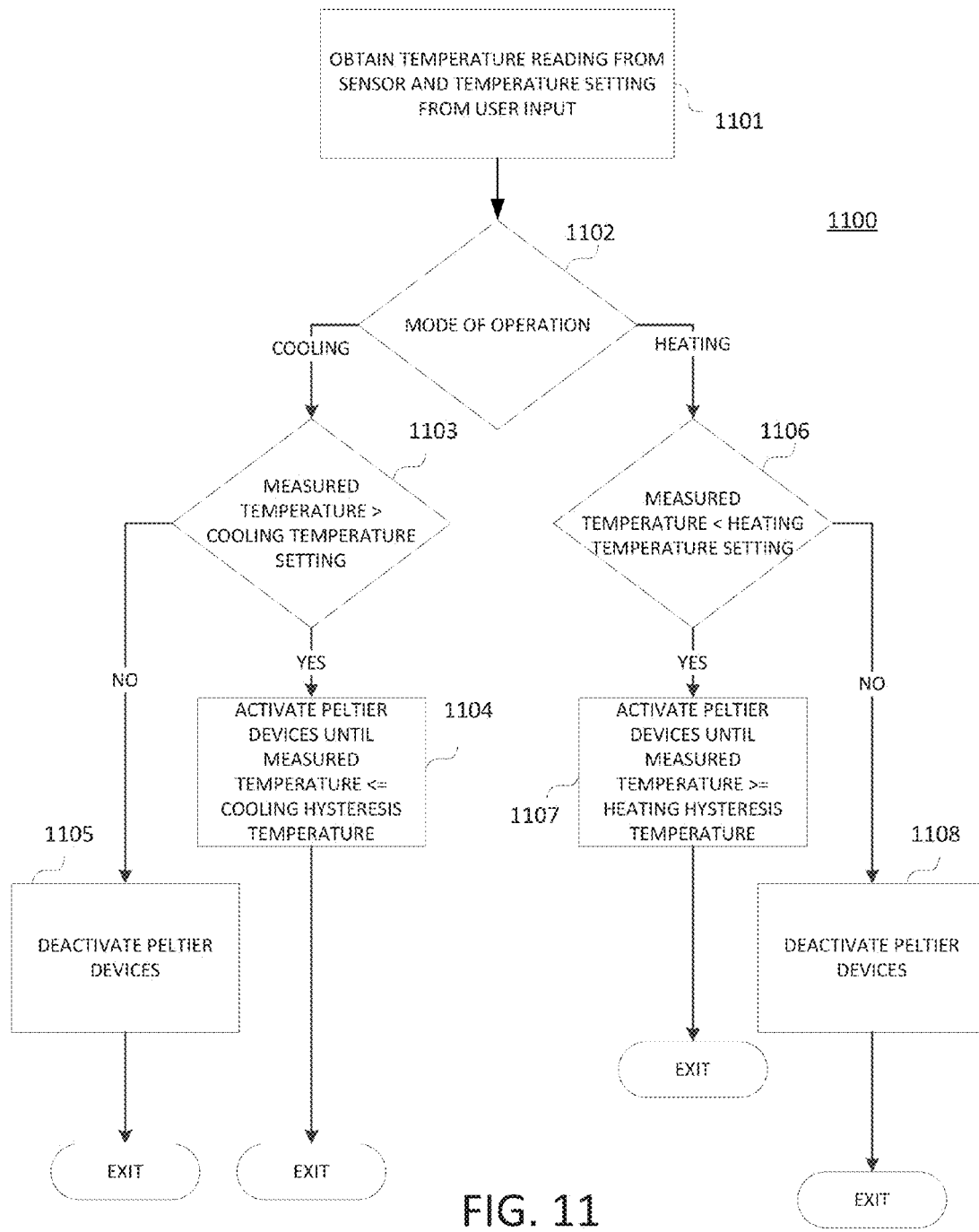
FIG. 11 shows a flowchart for controlling Peltier devices in accordance with an embodiment.

FIG. 8 shows a collection of Peltier devices for changing a serving surface temperature in accordance with an embodiment of the invention. Embodiments may support one or more Peltier devices in order to increase or decrease the temperature of a serving surface. With some embodiments, as shown in FIG. 8, four Peltier devices 802-805 may heat or cool serving surface 801. Some or all of the Peltier devices may be activated at one time. For example, when the temperature of serving surface 801 is within a temperature range, Peltier devices 802-805 may be deactivated. When the measured temperature of serving surface 801 is outside the temperature range, all of the Peltier devices 802-805 are activated. (This approach is incorporated in flowchart 1100 as shown in FIG. 11 and will be further discussed.) However, with some embodiments, only a proper subset of Peltier devices (e.g., devices 802 and 805 or devices 803 and 804) is activated at a given time when the temperature is outside the temperature range. Moreover, different subsets may be activated in a sequenced manner in order to provide more consistent thermal properties, such as more even cooling and/or heating, over serving surface 801. For example, a first subset and a second subset may be activated and deactivated, respectively, during a first time duration while reversing activation states during the second time duration.

Figure 9:
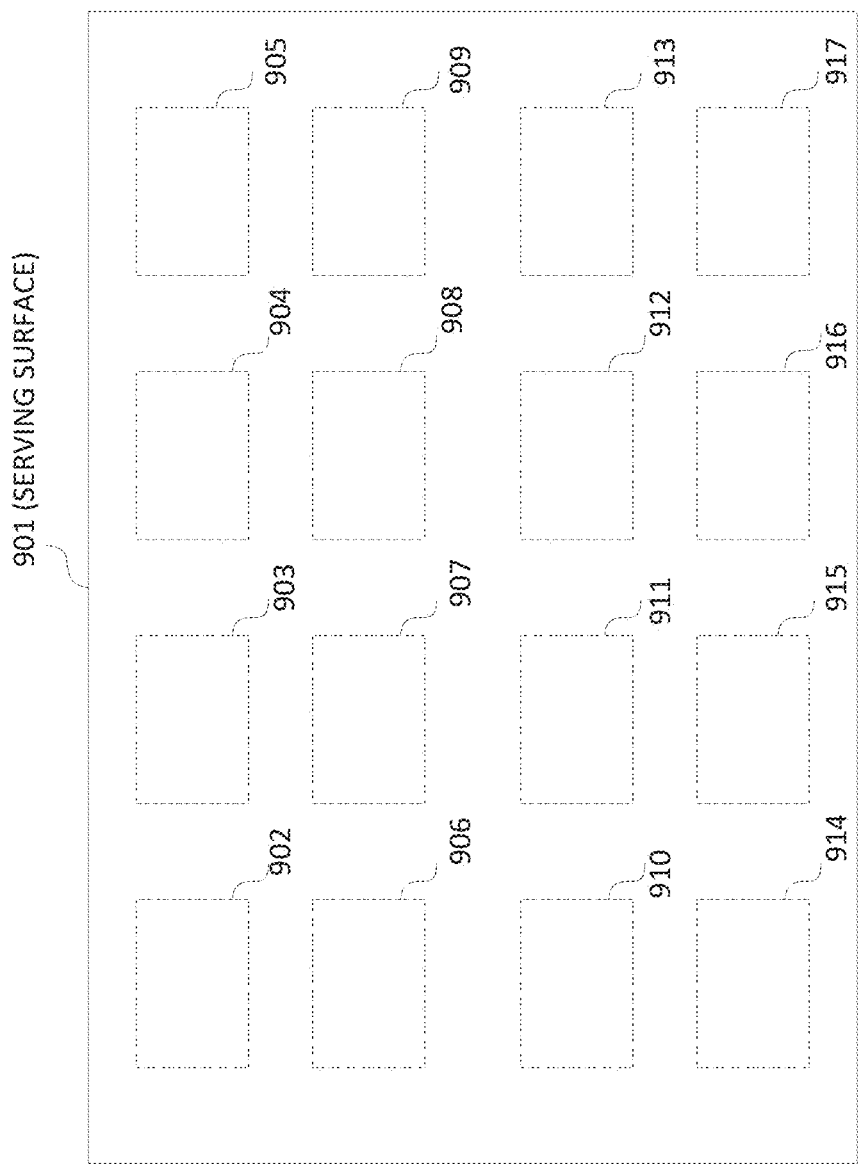
FIG. 9 shows an arrangement of Peltier devices for changing a serving surface in accordance with an embodiment of the invention.

Some embodiments may support a greater number of Peltier devices. However, the number of Peltier devices may be limited by physical constraints and/or electrical power limitations. FIG. 9 shows a collection of sixteen Peltier devices 902-917 for changing serving surface 901 in accordance with an embodiment of the invention. As discussed previously, some or all of devices 902-917 may be activated at the same time. Devices 902-917 may be partitioned into a plurality subsets, e.g., a first subset including devices 802, 805, 807, 808, 811, 812, 814, and 817, a second subset including 802, 804, 807, 809, 810, 812, 815, and 817, and third subset including devices 803, 805, 806, 808, 811, 813, 814, and 816, where some or all of the subsets may have overlapping members.

With some embodiments, the same Peltier devices may be used for different modes of operation. For example, referring to FIG. 8, Peltier devices 802-805 may be used both for heating and cooling.

With some embodiments, different Peltier devices may be used for different modes of operation. For example, Peltier devices 802 and 805 may be used for cooling while Peltier devices 803 and 804 may be used for heating. As another example, Peltier devices 802-805 may be used for cooling while only Peltier devices 502 and 805 are used for heating.

Figure 10:
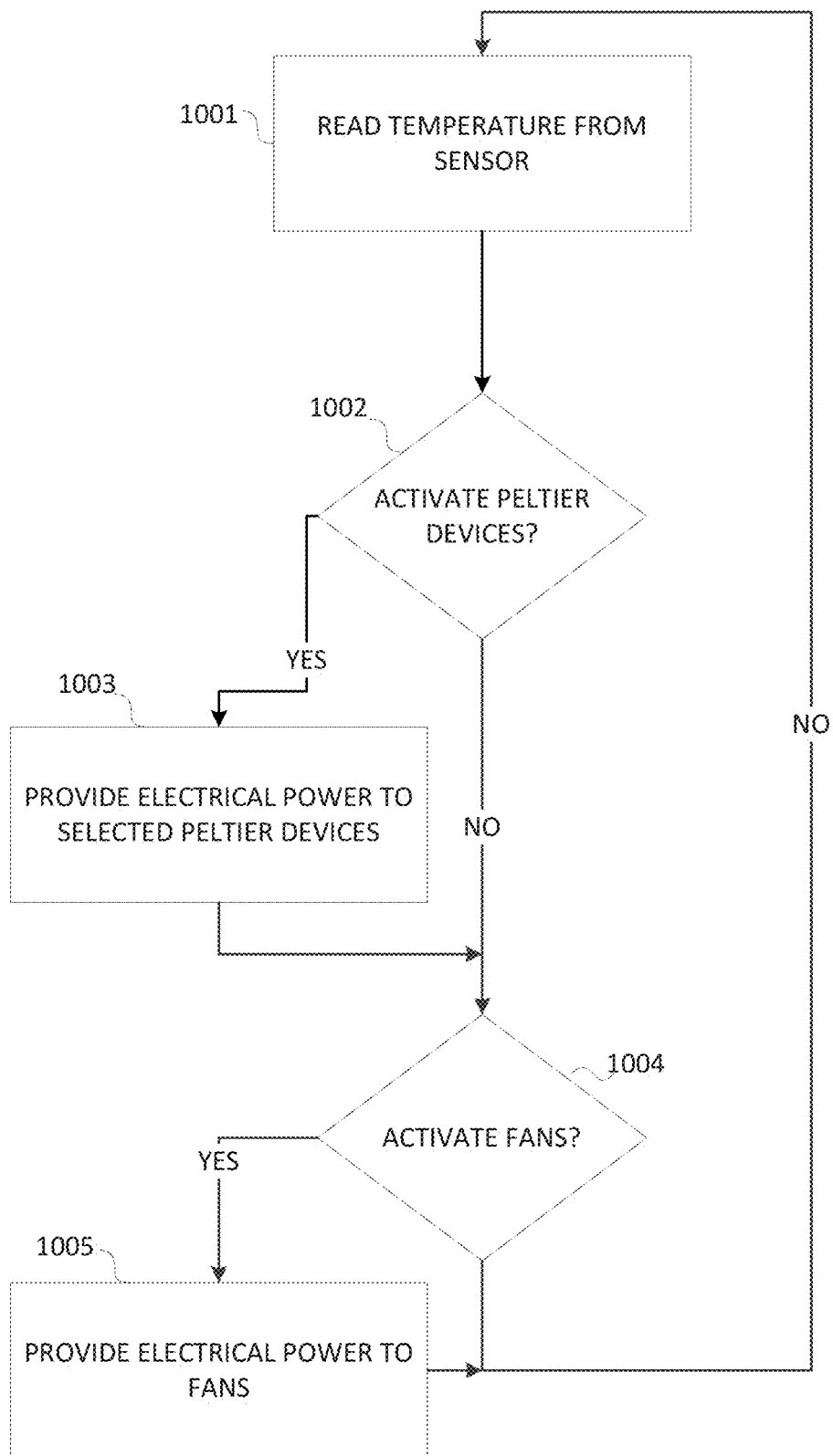
FIG. 10 shows a flowchart for controlling a serving apparatus in accordance with an embodiment.

FIG. 10 shows flowchart 1000 for controlling a serving apparatus in accordance with an embodiment. At block 1001, a control device (e.g., control device 108 as shown in FIG. 1) reads the measured temperature of the serving surface (e.g., surface 101) from the temperature sensor (e.g., sensor 109). At block 1002, the control device determines whether to activate some or all of the Peltier devices at block 1003. With some embodiments, selected Peltier devices (i.e., all or some of the Peltier devices) may be activated until the measured temperature reaches a hysteresis temperature so that a hysteresis characteristic is incorporated. For example, the temperature setting may be 35° F. when the serving apparatus is operating in the cooling mode. In such a case, the selected Peltier devices may be activated until the serving surface is cooled down sufficiently so that the measured temperature reaches 33° F. (the hysteresis temperature). The hysteresis temperature is typically offset from the temperature setting by several degrees so that control cycling is reduced. Different exemplary procedures for controlling the Peltier devices will be discussed in FIGS. 11 and 12.

At block 1004, the control device determines whether to activate one or more fans (e.g., fans 114 and 115). For example, with some embodiments the fans may be activated at block 1005 only when the measured temperature is outside a temperature range to assist transferring heat with the environment of the serving apparatus. However, with some embodiments, a fan may be activated only for specific operating modes, e.g., a cooling mode or a heating mode.

FIG. 11 shows flowchart 1100 for controlling Peltier devices in accordance with an embodiment. At block 1101 a control device obtains a measured temperature of a serving surface from a temperature sensor and the temperature setting (desired temperature) of the serving surface from a user input. At block 1102, the control device determines the mode of operation, i.e., cooling or heating. Based on the mode of operation, the control device determines whether to activate the Peltier devices based on the measured temperature, temperature setting, and hysteresis temperature at blocks 1103-1108.

At block 1103, the control device operates in the cooling mode and determines whether the measured temperature exceeds the cooling temperature setting. If so, the control device activates the Peltier devices until the measured temperature is less than or equal to the cooling hysteresis temperature at block 1104. Otherwise (i.e., the measured temperature does not exceed the cooling temperature setting), the control device deactivates the Peltier devices at block 1105.

At block 1106, the control device operates in the heating mode and determines whether the measured temperature is less than the heating temperature setting. If so, the control device activates the Peltier devices until the measured temperature is greater than or equal to the heating hysteresis temperature at block 1107. Otherwise (i.e., the measured temperature does not exceed the cooling temperature setting), the control device deactivates the Peltier devices at block 1108.

Figure 12:
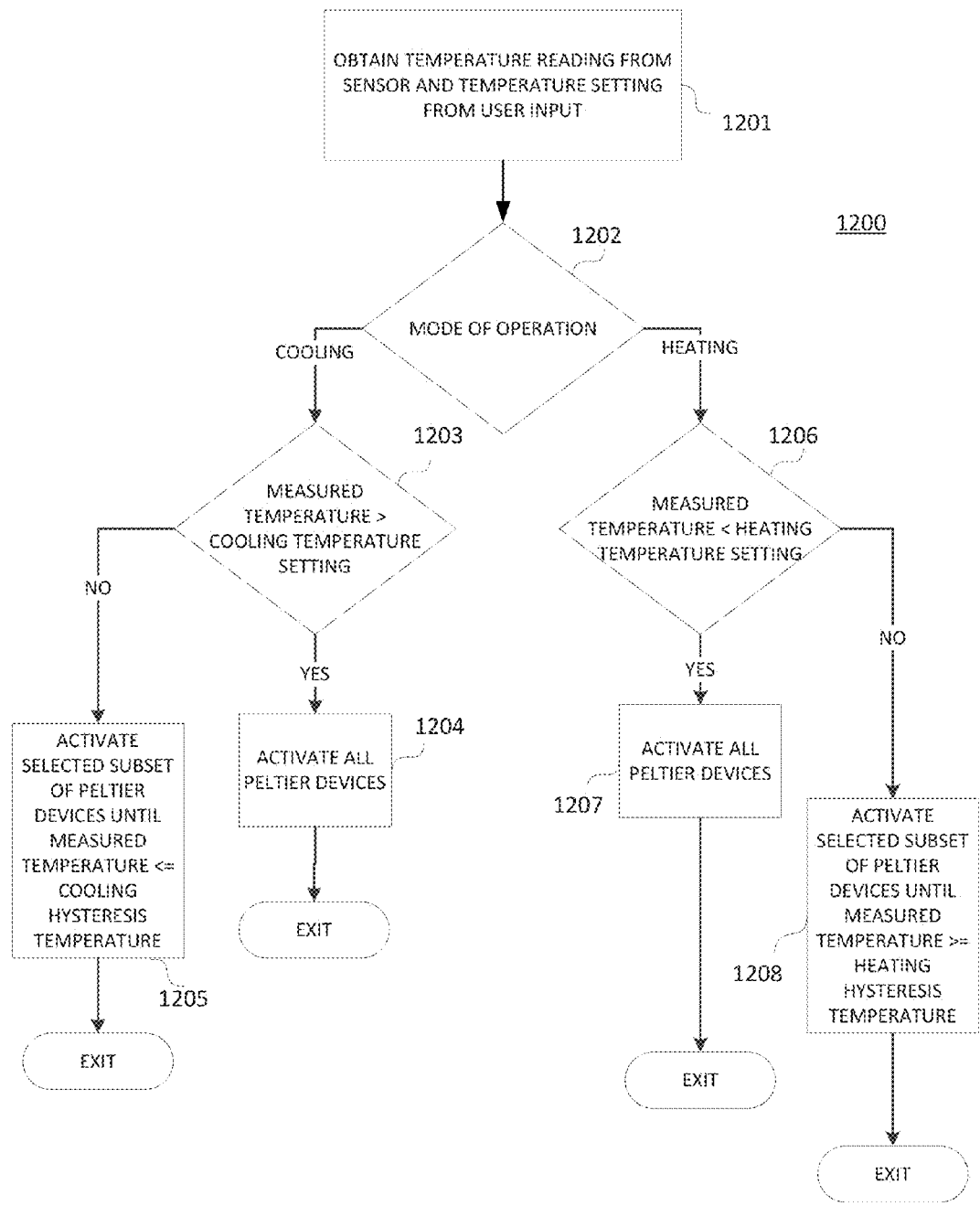
FIG. 12 shows a flowchart for controlling Peltier devices in accordance with an embodiment.

FIG. 12 shows flowchart 1200 for controlling Peltier devices in accordance with an embodiment. Flowchart 1200 is similar to flowchart 1100, where blocks 1201 and 1202 correspond to blocks 1101 and 1102, respectively. However, process 1200 activates all of the Peltier devices when the measured temperature is outside a temperature range (e.g., between the temperature setting and the hysteresis temperature) at blocks 1204 and 1207 and a selected subset of the Peltier devices when the measured temperature is within the temperature range at blocks 1205 and 1208. When operating at blocks 1205 and 1208, the control device may select different subsets from the plurality of Peltier devices and sequence through the different subsets. For example, referring to FIG. 9, the control device may first select and activate the first subset for a first time duration, followed by the second subset, followed by the third subset, followed by the first subset, and so forth.

Figure 13:
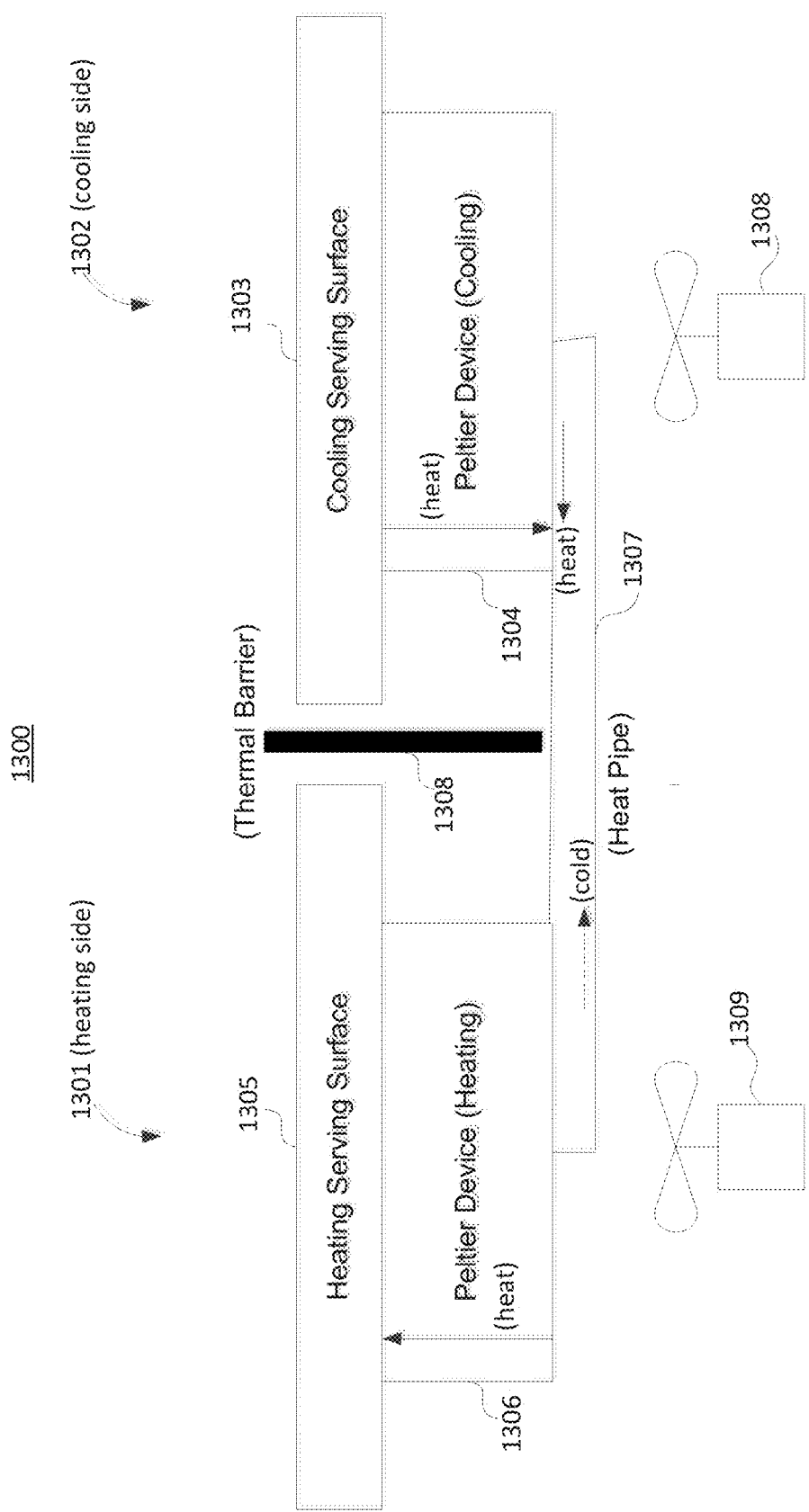
FIG. 13 shows a serving apparatus with a heating side and a cooling side in accordance with an embodiment.

FIG. 13 shows a serving apparatus 1300 with a heating side 1301 and a cooling side 1302 in accordance with an embodiment. Heating side 1301 and cooling side 1302 may operate at the same time so that heating serving surface 1305 may be heating one food item (e.g., hot cereal for breakfast) while cooling serving surface 1303 may be simultaneously cooling another food item (e.g., orange juice for breakfast).

Cooling serving surface 1303 is cooled by Peltier device 1304 transferring heat from its top to bottom, where Peltier device 1304 is thermally coupled to surface 1303. Heating service surface 1305 is thermally coupled to Peltier device 1306, which transfers heat from its bottom to its top. Consequently, waste heat is generated at the bottom of Peltier device 1304 while waste cold (loss of heat) is generated at the bottom of Peltier device 1306.

With some embodiments, Peltier device 1304 and/or Peltier device 1306 may comprise a plurality of plurality of Peltier devices similarly shown in FIGS. 8 and 9.

A first portion of heat pipe 1307 is thermally coupled to Peltier device 1304 while a second portion of heat pipe 1307 is thermally coupled to Peltier device 1306, in which the operation of heat pipe 1307 is similar to the operation of heat pipe 400 as shown in FIG. 4. Consequently, waste heat is transferred from Peltier device 1304 to Peltier device 1306, which absorbs some of the waste heat. On the other hand, waste cold is transferred from Peltier device 1306 to Peltier device 1304, which utilizes the cold in order to lower its operating temperature. As a result, waste heat and waste cold may be used by Peltier devices 1304 and 1306 that would have otherwise been expended into the surrounding environment.

Heat pipe 1307 may be directly coupled to Peltier device 1304 and/or Peltier device 1306. However, heat pipe 1307 may be thermally coupled to ambient air adjacent to the bottom of Peltier device 1304 and/or Peltier device 1306. With some embodiments, heat pipe 1307 may be thermally coupled to Peltier device 1304 and/or Peltier device 1306 through another material (e.g., similar to copper block 504 as shown in FIG. 5).

With some embodiments, heat pipe 1307 may be directly routed between Peltier devices 1304 and 1306, where heat pipe 1307 provides a continuous connection between the hot side and the cold side of Peltier devices 1304 and 1306, respectively. Consequently, separate heat sinks (heat exchange device) and fans (e.g., as shown in FIGS. 1, 2, and 5) may not be required because the opposite Peltier device may function as the heat sink for the other Peltier device. For example, the phase change (liquid to gas and/or gas to liquid) of heat pipe 1307 may cause heat/cold flow from one Peltier device to the other so that separate heat sinks and/or fans may not be needed to cause the temperature change to influence the heat/cold flow.

With some embodiments, heat pipe 1307 may be routed through a heat exchange device to assist in expending waste heat and/or waste cold. Heat pipe 1307 may have bends (not explicitly shown in FIG. 13) in order to route the heat transfer to or from a heat exchange device providing that the bends to not adversely affect the capillary or gravity action of heat pipe 1307. One or more fans 1308 and 1309 and/or heat exchange devices (not explicitly shown in FIG. 13) may be positioned in the vicinity of heat pipe 1307 to assist in the exchange of waste heat and/or cold.

Thermal barrier 1308 provides thermal separation (isolation) between heating side 1301 and cooling side 1302 so that heating serving surface 1305 and cooling serving surface 1303 do not adversely affect each other.

Figure 14:
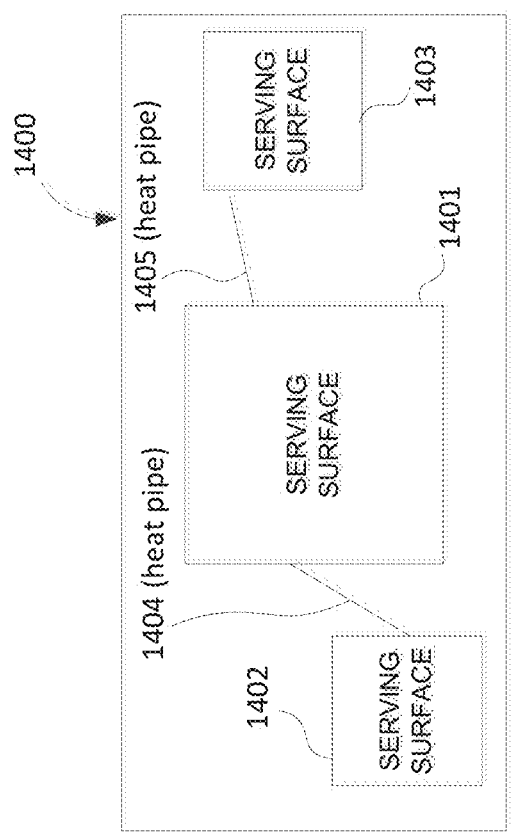
FIG. 14 shows a serving apparatus with serving surfaces in accordance with an embodiment.

While serving apparatus 1300 may support one heating surface (surface 1305) and one cooling surface (surface 1303), a serving apparatus may support more than two serving surfaces with some of the embodiments. For example, FIG. 14 shows a top view of apparatus 1400 that has heating surface 1401 (that may be used for the main course) and two cooling surfaces 1402 and 1403 (that may be used for a salad and cold desert, respectively). The surface areas and the temperature changes may be different for the different serving surfaces. For example, apparatus 1400 may have a plurality of cooling zones, where cooling surface 1402 chills a salad while cooling surface 1403 keeps ice cream from melting. Moreover, while serving surfaces 1401-1403 are depicted as rectangularly shaped, some embodiments may have differently shaped serving surfaces. Also, with some embodiments, surfaces 1401-1403 may have flat or concave surfaces in order to better contain the served item.

With some embodiments, heat pipes 1404 and 1405 may be routed between serving surfaces 1401, 1402, and 1403 to assist in expending waste heat and/or waste cold. Different heat pipe configurations may be supported such as routing a heat pipe between a pair of serving surfaces (e.g., between serving surfaces 1401 and 1402) or routing a heat pipe across more than two serving surfaces (e.g., 1401, 1402, and 1403).

Figure 15:
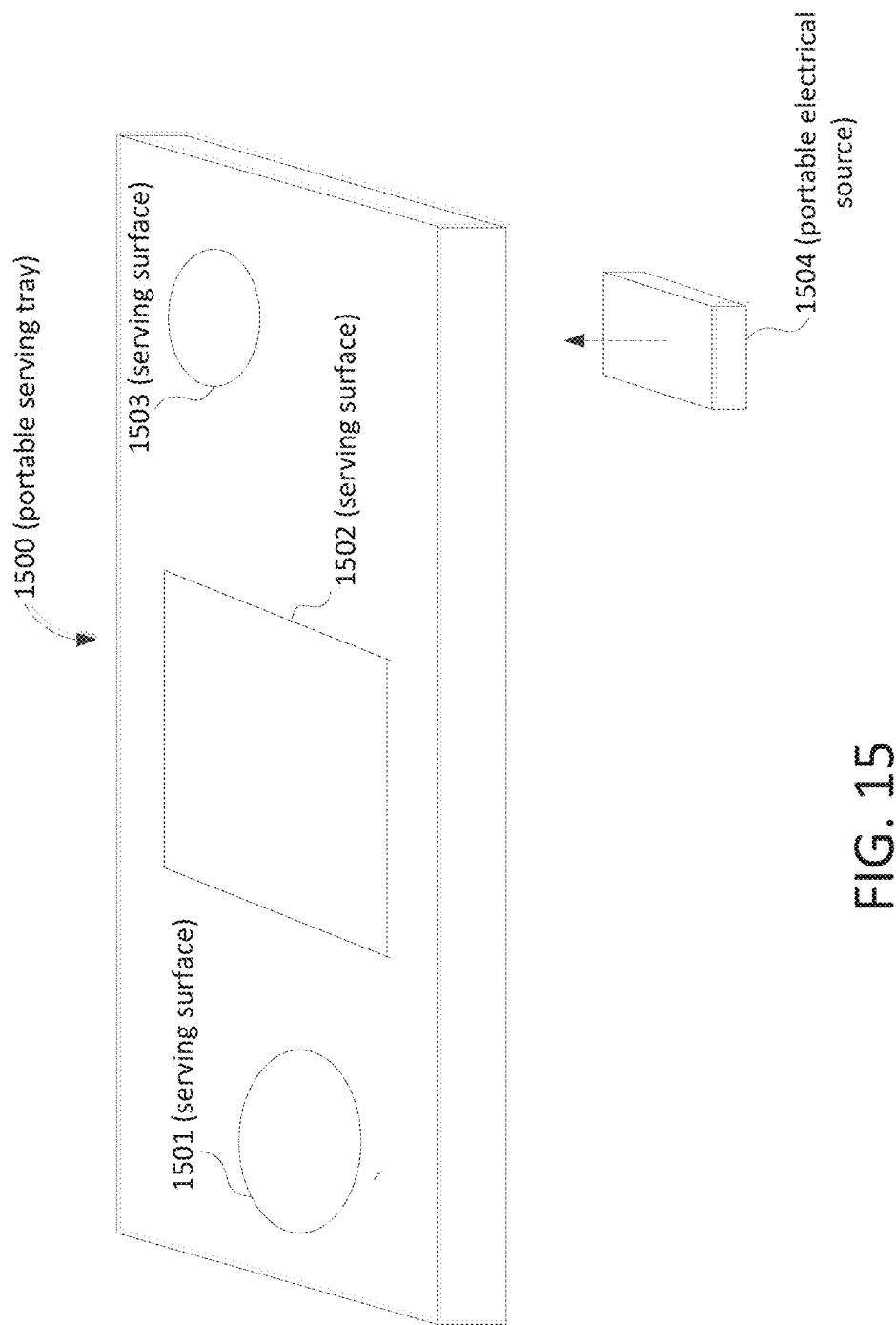
FIG. 15 shows a portable serving tray in accordance with an embodiment.

FIG. 15 shows portable serving tray 1500 that supports serving surfaces 1501-1503 that may be used to heat or cool different items in accordance with an embodiment. Portable serving tray 1500 contains at least one Peltier device (not explicitly shown in FIG. 15) to provide desirable temperature changes for serving surfaces 1501-1503. In order to have portable operating characteristics, portable serving tray 1500 may be powered by portable electrical source 1504 that may be inserted into tray 1500. With some embodiments, portable electrical source 1504 may include a battery and/or fuel cell.

Portable serving tray 1500 may be used in different serving environments, including a hospital, hotel, or restaurant. Also, different types of items may be heated or cooled, including food, liquids, and non-eatable items.

Figure 16:
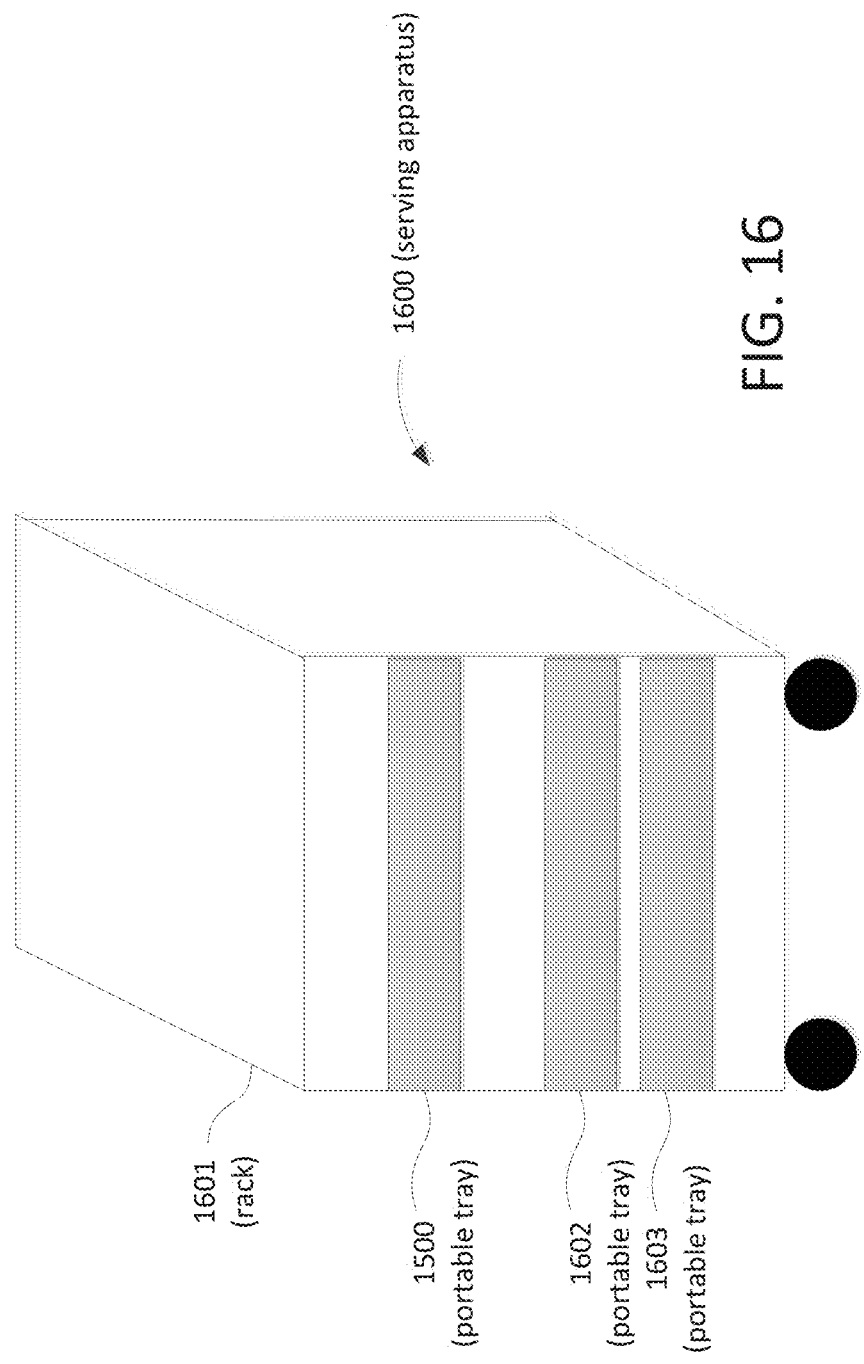
FIG. 16 shows a plurality of portable trays stacked in a rack in accordance with an embodiment.

FIG. 16 shows serving apparatus 1600 with a plurality of portable trays 1500 (as shown in FIG. 15) and 1602-1603 stacked in rack 1601 in accordance with an embodiment. Portable trays 1500 and 1602-1603 may be stacked into rack 1601 so that trays 1602-1604 can be transported to a desired location. In addition, rack 1600 provides a holding means (e.g., slots or shelves) so that the portable trays can be inserted into and removed from rack 1600.

As can be appreciated by one skilled in the art, a computer system with an associated computer-readable medium containing instructions for controlling the computer system may be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for changing a first measured temperature of a cooling serving surface for a cooling zone of an apparatus and a second measured temperature of a heating serving surface for a heating zone of the apparatus, the method comprising:
   transporting waste heat from a bottom of a cooling semiconductor device to a bottom of a heating semiconductor device;
   transporting waste cold from the bottom of the heating semiconductor device to the bottom of the cooling semiconductor device; and
   activating the heating and cooling semiconductor devices so that the cooling serving surface and the heating serving surface are operational at a same time.

2. The method of claim 1, wherein the cooling zone and the heating zone are thermally isolated.

3. The method of claim 1, wherein the waste heat and the waste cold are transported through a heat pipe.

4. The method of claim 3, wherein the heat pipe is directly coupled to the cooling semiconductor device, the heating semiconductor device, or both semiconductor devices.

5. The method of claim 1, further comprising:
   transporting waste heat from the cooling semiconductor device and waste cold from the heating semiconductor device to a heat exchange device.

6. The method of claim 1, wherein the cooling semiconductor device comprises at least one cooling Peltier device and the heating semiconductor device comprises at least one heating Peltier device.

7. The method of claim 3, wherein the heat pipe provides a continuous connection between the cooling semiconductor device and the heating semiconductor device.

8. The method of claim 7, wherein the heating semiconductor device acts as the sole heat sink component for waste heat from the cooling semiconductor device.

9. The method of claim 7, wherein no separate heat sink components, heat exchange devices, or fans assist in the transporting of the waste heat.

10. A serving apparatus comprising:
    a first portable serving tray comprising:
        a top surface, the top surface comprising one or more serving surfaces supported by the first serving tray; and
        at least one Peltier device contained within the first serving tray and configured to change a temperature of at least one of the one or more serving surfaces;
    a first portable electrical source configured to provide electrical power to the at least one Peltier device of the first serving tray;
    a rack configured to separately hold a plurality of portable serving trays, wherein the plurality of portable serving trays are stackable within the rack and removable from the rack;
    a second portable serving tray comprising:
        a top surface, the top surface comprising one or more serving surfaces supported by the second serving tray; and
        at least one Peltier device contained within the second serving tray and configured to change a temperature of at least one of the one or more serving surfaces; and
    a second portable electrical source configured to provide electrical power to the at least one Peltier device of the second serving tray;
    wherein the the first portable serving tray and the second portable serving tray are operable when positioned at different locations.

11. The serving apparatus of claim 10, further comprising a thermal barrier isolating the first portable serving tray and the second portable serving tray.

12. The serving apparatus of claim 10, wherein the portable electrical sources each comprise one or more of a battery and a fuel cell.

13. The serving apparatus of claim 10, wherein the portable electrical sources are configured to be inserted into the trays.

14. An apparatus comprising:
    one or more cooling zones, each cooling zone comprising one or more cooling semiconductor devices configured to transfer heat from a top to a bottom of the cooling semiconductor device, and one or more cooling serving surfaces thermally coupled with the top of at least one cooling semiconductor device;
    one or more heating zones, each heating zone comprising at one or more heating semiconductor devices configured to transfer heat from a bottom to a top of the heating semiconductor device, and one or more heating serving surfaces thermally coupled with the top of at least one heating semiconductor device; and
    at least one heat transfer device comprising a first portion and a second portion, the first portion thermally coupled with the bottom of at least one cooling semiconductor device, the second portion thermally coupled with the bottom of at least one heating semiconductor device, the heat transfer device being configured to transfer waste heat from the bottom of at least one cooling semiconductor device and transfer waste cold from the bottom of at least one heating semiconductor device.

15. The apparatus of claim 14, wherein the apparatus comprises two or more cooling zones, two or more heating zones, or a combination thereof.

16. The apparatus of claim 15, wherein the heat transfer device comprises at least a third portion, and wherein the three portions of the heat transfer device are thermally coupled to one or more semiconductor devices of three separate zones of the apparatus.

17. The apparatus of claim 15, further comprising at least a second heat transfer device comprising a first portion and a second portion, the first portion thermally coupled with the bottom of at least one cooling semiconductor device, the second portion thermally coupled with the bottom of at least one heating semiconductor device, the second heat transfer device being configured to transfer waste heat from the bottom of at least one cooling semiconductor device and transfer waste cold from the bottom of at least one heating semiconductor device.

18. The apparatus of claim 14, wherein the heat transfer device is a heat pipe, and wherein no separate heat sink components, heat exchange devices, or fans assist in the transfer of the waste heat.

19. The apparatus of claim 14, wherein the heat transfer device is a heat pipe, and the apparatus further comprises at least one heat exchange device, at least one fan configured to assist in the exchange of waste heat, or a combination thereof.

\* \* \* \* \*